(12) United States Patent
Kimura et al.

(10) Patent No.: US 7,135,293 B2
(45) Date of Patent: Nov. 14, 2006

(54) METHOD OF DETECTING A NUCLEIC ACID USING A FLUORESCENT GROUP-CONTAINING CARBODIIMIDE AS A LABEL

(75) Inventors: Naoki Kimura, Chiba (JP); Namiko Shiohata, Chiba (JP); Yoko Yoshikawa, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 518 days.

(21) Appl. No.: 10/654,305

(22) Filed: Sep. 2, 2003

(65) Prior Publication Data

US 2004/0049047 A1   Mar. 11, 2004

Related U.S. Application Data

(62) Division of application No. 09/533,918, filed on Mar. 23, 2000, now Pat. No. 6,642,380.

(30) Foreign Application Priority Data

Mar. 25, 1999  (JP) .................................. 11-81666
Oct. 5, 1999   (JP) ................................ 11-284107

(51) Int. Cl.
*C12Q 1/68*   (2006.01)

(52) U.S. Cl. ............................................ 435/6; 436/94

(58) Field of Classification Search .................... 435/6; 436/94
See application file for complete search history.

(56) References Cited

U.S. PATENT DOCUMENTS

| | | | |
|---|---|---|---|
| 3,754,032 | A | 8/1973 | Tomalia et al. |
| 3,769,344 | A | 10/1973 | De Vries |
| 5,856,479 | A | 1/1999 | Suzuki et al. |

FOREIGN PATENT DOCUMENTS

| | | |
|---|---|---|
| EP | 0 718 300 A1 | 6/1996 |
| EP | 0 808 829 A1 | 11/1997 |
| ES | 481581 | 2/1980 |
| JP | 10 287870 | 10/1998 |

*Primary Examiner*—Kenneth R. Horlick
(74) *Attorney, Agent, or Firm*—Knobbe, Martens, Olson & Bear, LLP

(57) ABSTRACT

A novel fluorescent group-containing carbodiimide compound having at least one group selected from a carboxyl group, a sulfo group, a phosphono group and a phospho group which have substitution of an alkali metal, an alkaline earth metal or a basic group containing a nitrogen or phosphorus atom, which is prepared by using a novel fluorescent group-containing carbodiimide compound precursor having a halogen atom or a sulfonic acid group; and a method for detecting a nucleic acid by hybridization utilizing a nucleic acid labeled with a labeling substance, which utilizes the fluorescent group-containing carbodiimide compound as the labeling substance.

3 Claims, No Drawings

METHOD OF DETECTING A NUCLEIC ACID USING A FLUORESCENT GROUP-CONTAINING CARBODIIMIDE AS A LABEL

This application is a division of U.S. patent application Ser. No. 09/533,918, filed Mar. 23, 2000, now U.S. Pat. No. 6,642,380, issued Nov. 4, 2003, which claims priority to JP 11-81666, filed Mar. 25, 1999.

BACKGROUND OF THE INVENTION

The present invention relates to a novel fluorescent group-containing carbodiimide compound precursor and a fluorescent group-containing carbodiimide compound. More specifically, it relates to a fluorescent group-containing carbodiimide compound precursor that contains a halogen atom or a sulfonic acid group, which enables easy and efficient bonding of a fluorescent group and a method for producing it, as well as a fluorescent group-containing carbodiimide compound which has at least one group selected from a carboxyl group, a sulfo group, a phosphono group and a phospho group, which enables easy and efficient introduction of a fluorescent group into nucleic acids and proteins, a method for producing it and an analysis method utilizing it.

As methods for introducing a fluorescent substance into nucleic acids, there have been known, for example, introduction of a fluorescent substance into a nucleic acid by using a nucleotide bonded to a fluorescent substance through an enzymatic reaction and so forth (Japanese Patent Application Application Laid-open No. 6-271599), bonding of streptavidin, to which a fluorescent substance has already been bonded, to a biotin-labeled nucleic acid, a reaction of a fluorescent substance containing an amine-reactive group with a nucleic acid bonded to an amino-linker and so forth. In addition, there are also methods other than the above, such as utilization of a fluorescent group-containing carbodiimide compound which is highly reactive to nucleic acid bases (Japanese Patent Application Application Laid-open No. 10-287870).

However, among the aforementioned methods, the method described in Japanese Patent Application Laid-open No. 6-271599, the method utilizing biotin labeling and the method utilizing amino-linker bonding have drawbacks that it is not possible to introduce the fluorescent substance into naturally occurring nucleic acids, and the operations are complicated. The fluorescent group-containing carbodiimide compound exhibit good solubility in water because of the existence of quaternary ammonium salt in its molecular structure. However, in order to utilize a fluorescent substance with low solubility in water, such as a fluorescent substance having such a large electron system that it should have absorption in the near-infrared region, further improvement of the water solubility has been desired.

SUMMARY OF THE INVENTION

The object of the present invention is to provide a novel fluorescent group-containing carbodiimide compound, which enables efficient and easy introduction of fluorescent groups into proteins and nucleic acids including naturally occurring nucleic acids, and exhibits sufficient water solubility, and to provide a fluorescent group-containing carbodiimide compound precursor, which can be easily and efficiently bonded to a fluorescent group, and is suitable for the production of the aforementioned fluorescent group-containing carbodiimide compound.

The inventors of the present invention earnestly studied in order to achieve the aforementioned object. As a result, they found that a fluorescent group-containing carbodiimide compound having at least one group selected form a carboxyl group, a sulfo group, a phosphono group and a phospho group with sufficient water solubility could be produced by starting from a carbodiimide compound having a halogen atom or a sulfonic acid group, and that a fluorescent group could be easily and efficiently introduced into nucleic acids including naturally occurring nucleic acids and proteins by utilizing the aforementioned fluorescent group-containing carbodiimide compound. Thus, they accomplished the present invention.

The present invention provides the followings.

(1) A fluorescent group-containing carbodiimide compound precursor having a halogen atom or a sulfonic acid group which is represented by the following general formula (I):

$$B-Y^3-N=C=N-Y^2-W-Y^1-[A]_n-Y^4-X \qquad (I)$$

wherein,

X represents a halogen atom or a sulfonic acid group;

A represents a functional group which is selected from the group consisting of $-CH_2-$, $-NHCO-$, $-CONH-$, $-O-$, $-S-$, $-NR^1-$ wherein $R^1$ represents a linear, cyclic or branched saturated or unsaturated aliphatic hydrocarbon group having 1–20 carbon atoms, $-NR^2R^3-$ wherein $R^2$ and $R^3$ independently represent a hydrogen atom, a linear or branched saturated or unsaturated aliphatic hydrocarbon group having 1–20 carbon atoms, or a cycloalkyl group, an aryl group or an aralkyl group which may have a substituent, provided that when one of $R^2$ and $R^3$ is a hydrogen atom, the other represents a linear or branched saturated or unsaturated aliphatic hydrocarbon group having 1–20 carbon atoms, or a cycloalkyl group, an aryl group or an aralkyl group which may have a substituent, or $R^2$ and $R^3$ may be bonded to each other to form as a whole a nitrogen-containing heterocyclic group which may contain an oxygen atom, $-COO-$, $-OCO-$, $-NHSO_2-$, $-NHC(S)NH-$ and $-SO_2NH-$;

n represents 0 or 1;

W represents a direct bond or a quaternary onium group;

$Y^1$, $Y^2$, $Y^3$ and $Y^4$ each independently represent a functional group represented by the general formula (II):

$$-(CH_3)_p-(L)_r-(CH_2)_q- \qquad (II)$$

wherein, L represents a functional group selected from the group consisting of $-CH_2-$, $-NHCO-$, $-CONH-$, $-O-$, $-S-$, $-NR^1-$ wherein $R^1$ has the same meaning as defined for the formula (I), $-NR^2R^3-$ wherein $R^2$ and $R^3$ have the same meanings as defined for the formula (I), $-COO-$, $-OCO-$, $-NHSO_2-$, $-NHC(S)NH-$ and $-SO_2NH-$; p and q each independently represent an integer of from 0 to 20, and r represents 0 or 1;

B represents a hydrogen atom or a monovalent organic group being either the same as or different from $-W-Y^1-[A]_n-Y^4-X$ in the formula (I); and any of the functional groups represented by B, $Y^1$, $Y^2$, $Y^3$, $Y^4$, A or W may have a group selected from a carboxyl group, a sulfo group, a phosphono group or a phospho group which have substitution of an alkali metal, an alkaline earth metal or a basic group containing a nitrogen or phosphorus atom.

(2) A fluorescent group-containing carbodiimide compound having at least one group selected from a carboxyl group, a sulfo group, a phosphono group and a phospho group which have substitution of an alkali metal, an alkaline earth metal or a basic group containing a nitrogen or phosphorus atom, which is represented by the following general formula (III):

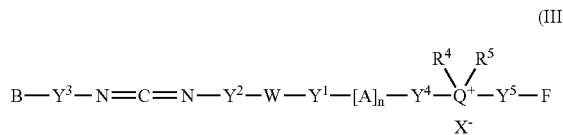

(III)

wherein,

B, $Y^1$, $Y^2$, $Y^3$, $Y^4$, A, X, W and n have the same meanings as defined for the general formula (I);

F represents a fluorescent group;

Q represents either a tertiary or quaternary nitrogen atom, or a tertiary or quaternary phosphorus atom;

$R^4$ and $R^5$ each independently represent a hydrogen atom, a linear or branched saturated or unsaturated aliphatic hydrocarbon group having 1–20 carbon atoms, or a cycloalkyl group, an aryl group or an aralkyl group which may contain a substituent, provided that when one of $R^4$ and $R^5$ is a hydrogen atom, the other represents a linear or branched saturated or unsaturated aliphatic hydrocarbon group having 1–20 carbon atoms, or a cycloalkyl group, an aryl group or an aralkyl group which may contain a substituent, or $R^4$ and $R^5$ may be bonded to each other to form a nitrogen-containing heterocyclic group or a phosphorus-containing heterocyclic group, which may contain an oxygen atom, as -$Q^+R^4R^5$—;

$Y^5$ has the same meaning as defined for $Y^1$, $Y^2$, $Y^3$ and $Y^4$;

at least one functional group selected from B, $Y^1$, $Y^2$, $Y^3$, $Y^4$, $Y^5$, A, W, $R^4$, $R^5$ and F has at least one group selected from a carboxyl group, a sulfo group, a phosphono group and a phospho group which have substitution of an alkali metal, an alkaline earth metal or a basic group containing a nitrogen or phosphorus atom.

(3) The fluorescent group-containing carbodiimide compound precursor according to (1), wherein at least one functional group selected from B, $Y^1$, $Y^2$, $Y^3$, $Y^4$, A and W in the formula (I) has at least one group selected from a carboxyl group, a sulfo group, a phosphono group and a phospho group which have substitution of an alkali metal, an alkaline earth metal or a basic group containing a nitrogen or phosphorus atom.

(4) The fluorescent group-containing carbodiimide compound according to (2), wherein at least one functional group selected from B, $Y^1$, $Y^2$, $Y^3$, $Y^4$, A and W in the formula (III) has at least one group selected from a carboxyl group, a sulfo group, a phosphono group and a phospho group which have substitution of an alkali metal, an alkaline earth metal or a basic group containing a nitrogen or phosphorus atom.

(5) The fluorescent group-containing carbodiimide compound according to (2), wherein at least one functional group selected from $Y^5$, $R^4$, $R^5$ and F in the formula (III) has at least one group selected from a carboxyl group, a sulfo group, a phosphono group and a phospho group which have substitution of an alkali metal, an alkaline earth metal or a basic group containing a nitrogen or phosphorus atom.

(6) A method for producing the fluorescent group-containing carbodiimide compound precursor as defined in (1), which comprises the following steps (A), (B) and (C):

(A) a step of synthesizing a (thio)urea compound represented by the following general formula (VI) through a reaction of an iso(thio)cyanate compound represented by the following general formula (IV) with an amine compound represented by the following general formula (V):

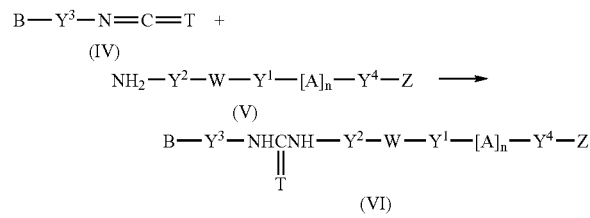

wherein, B, $Y^1$, $Y^2$, $Y^3$, $Y^4$, A, W and n have the same meanings as defined for the aforementioned formula (I); T represents an oxygen atom or a sulfur atom; and Z represents a hydroxyl group, an alkyl group, an alkenyl group, a vinyl group, an allyl group, a phenyl group, a carboxyl group, a sulfonyl group-containing derivative group or a phosphonium group;

(B) a step of halogenating or sulfonating the compound represented by the general formula (VI) obtained in the aforementioned step (A) to prepare a compound represented by the following general formula (VII):

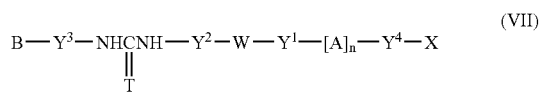

wherein, B, $Y^1$, $Y^2$, $Y^3$, $Y^4$, W, A, n and X have the same meanings as defined for the formula (I); and T represents an oxygen atom and or a sulfur atom;

(C) a step of carbodiimidating the compound represented by the following general formula (VII) obtained in the aforementioned step (B) by dehydration or oxidative desulfurization reaction.

(7) The production method according to (6), which produces the fluorescent group-containing carbodiimide compound precursor as defined in (3), wherein at least one functional group selected from B, $Y^1$, $Y^2$, $Y^3$, $Y^4$, A and W has at least one group selected from a carboxyl group, a sulfo group, a phosphono group and a phospho group which have substitution of an alkali metal, an alkaline earth metal or a basic group containing a nitrogen or phosphorus atom.

(8) A method for producing the fluorescent group-containing carbodiimide compound as defined in (2), which comprises a step of selecting a carbodiimide compound and a fluoresent group-containing compound from the fluorescent group-containing carbodiimide compound precursor as defined in (1) and a fluorescent group-containing compound represented by the following general formula (VIII):

wherein, $R^4$, $R^5$, $Y^5$ and F have the same meanings as defined for the general formula (III), and Q' represents a secondary or tertiary nitrogen-containing group or a secondary or tertiary phosphorus-containing group which may have substitution of a group selected from a hydroxyl group, an alkyl group, an alkenyl group, a vinyl group, an allyl group, a phenyl group, a carboxyl group, a sulfonyl group-containing derivative group and a phosphonium group, respectively, so that at least one of the carbodidimide compound and the fluorescent group-containing compound should have a functional group selected from a carboxyl group, a sulfo group, a phosphono group and a phospho group which have substitution of an alkali metal, an alkaline earth metal or a basic group containing a nitrogen or phosphorus atom, to allow the carbodidimide compound and the fluorescent group-containing compound to react with each other.

(9) The production method according to (8) for producing the fluorescent group-containing carbodiimide compound according to (4), wherein at least one functional group selected from B, $Y^1$, $Y^2$, $Y^3$, $Y^4$, A and W has at least one group selected from a carboxyl group, a sulfo group, a phosphono group or a phospho group which are substituted with an alkali metal, an alkaline earth metal or a basic group containing a nitrogen or phosphorus atom.

(10) The production method according to (8), which produces the fluorescent group-containing carbodiimide compound as defined in (5), wherein at least one functional group selected from $Y^5$, $R^4$, $R^5$ and F has at least one group selected from a carboxyl group, a sulfo group, a phosphono group or a phospho group which are substituted with an alkali metal, an alkaline earth metal or a basic group containing a nitrogen or phosphorus atom.

(11) A method for detecting a nucleic acid by hybridization utilizing a nucleic acid labeled with a labeling substance, wherein the fluorescent group-containing carbodiimide compound as defined in (2) is used as the labeling substance.

(12) The method according to (11), wherein the fluorescent group-containing carbodiimide compound as defined in (4) as is used the labeling substance.

(13) The method according to (11), wherein the fluorescent group-containing carbodiimide compound as defined in (5) as is used the labeling substance.

The fluorescent group-containing carbodiimide compound of the present invention exhibits sufficient water solubility, and use of it enables efficient and easy introduction of fluorescent groups into proteins and nucleic acids. Furthermore, the fluorescent group-containing carbodiimide compound precursor of the present invention is particularly suitable for the production of the aforementioned fluorescent group-containing carbodiimide compound, since it can be easily and efficiently bonded to a fluorescent group.

The term "iso(thio)cyanate compound" used herein refers to an isocyanate compound or an isothiocyanate compound. The term "(thio)urea compound" used herein refers to a urea compound or a thiourea compound. The term "sulfonyl group-containing derivative group" used herein refers to a monovalent group created when one of the valences of a divalent sulfonyl molecule is used to bond with an atom or a group. Examples of the sulfonyl group-containing derivative group are alkylsulfonyl groups and alkoxyphenyl groups.

DETAILED DESCRIPTION OF THE INVENTION

Embodiments of the present invention will be described hereafter. The fluorescent group-containing carbodiimide compound of the present invention will be explained first.

(1) Fluorescent Group-containing Carbodiimide Compound

The fluorescent group-containing carbodiimide compound of the present invention having at least one group selected from a carboxyl group, a sulfo group, a phosphono group and a phospho group which have substitution of an alkali metal, an alkaline earth metal or a basic group containing a nitrogen or phosphorus atom is a compound represented by the general formula (III). The method for producing this compound is not particularly limited. For example, it can be produced by selecting a carbodiimide compound and a fluorescent group-containing compound from a fluorescent group-containing carbodidimide compound precursor having a halogen atom and a sulfonic acid group represented by the general formula (I) and a fluorescent group-containing compound represented by the general formula (VIII), respectively, so that at least one of the carbodidimide compound and the fluorescent group-containing compound should have a functional group selected from a carboxyl group, a sulfo group, a phosphono group and a phospho group which have substitution of an alkali metal, an alkaline earth metal or a basic group containing a nitrogen or phosphorus atom, to allow them to reaction with each other.

(i) Fluorescent Group-containing Carbodiimide Compound Precursor

According to the present invention, the fluorescent group-containing carbodiimide compound precursor having a halogen atom or a sulfonic acid group has a structure represented by the general formula (I).

X in the formula (I) is not particularly limited so long as it is either a halogen atom or a sulfonic acid group, and known ones can be used. In particular, Cl, Br or I atoms are preferable as the halogen atom because of reactivity. As the sulfonic acid group, a tosyl group and a mesyl group are preferable because of reactivity.

In the formula (I), A represents a functional group selected from the group consisting of —$CH_2$—, —NHCO—, —CONH—, —O—, —S—, —$NR^1$—, —$NR^2R^3$—, —COO—, —OCO—, —$NHSO_2$—, —NHC(S)NH— and —$SO_2NH$—, and n represents 0 or 1.

$R^1$ represents a linear, cyclic or branched saturated or unsaturated aliphatic hydrocarbon group having 1–20 carbon atoms. $R^2$ and $R^3$ each independently represent a hydrogen atom, a linear or branched saturated or unsaturated aliphatic hydrocarbon groups having 1–20 carbon atoms, or a cycloalkyl group, an aryl group or an aralkyl group which may have a substituent. However, when one of $R^2$ and $R^3$ is a hydrogen atom, the other represents a linear or branched saturated or unsaturated aliphatic hydrocarbon group having 1–20 carbon atoms, or a cycloalkyl group, an aryl group, or an aralkyl group which may have a substituent. Further, $R^2$ and $R^3$ may be bonded to each other to form as a whole a nitrogen-containing heterocyclic group which may contain an oxygen atom. As described above, n represents 0 or 1, and thus the compound represented by the general formula (I) may or may not have A.

A group selected from a carboxyl group, a sulfo group, a phosphono group and a phospho group which have substitution of an alkali metal, an alkaline earth metal or a basic group containing a nitrogen or phosphorus atom may be substituted for any replaceable hydrogen atom of A.

W represents a direct bond or a quaternary onium group. The term "quaternary onium group" used herein refers to a group which can form a quaternary onium salt when it is introduced into the compound of the formula (I). Specific examples of such a quaternary onium group include those groups represented by the following general formulae (IX), (X) and (XI):

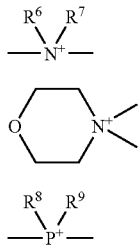

wherein, $R^6$, $R^7$, $R^8$ and $R^9$ each independently represent a linear or branched saturated or unsaturated aliphatic hydrocarbon group having 1–20 carbon atoms, a cycloalkyl group, an aryl group or aralkyl group having 6–20 carbon atoms. These hydrocarbon groups may have substitution of a carboxyl group, a sulfonyl group-containing derivative group, a phosphonium group, a phenyl group, a cycloalkyl group, or a hydroxyl group.

Of the above quaternary onium groups, particularly preferred groups used in the present invention are the quaternary onium group represented by the formula (IX) in which $R^6$ and $R^7$ are alkyl groups, and the group represented by the general formula (X).

Furthermore, a group selected from a carboxyl group, a sulfo group, a phosphono group and a phospho group which have substitution of an alkali metal, an alkaline earth metal or a basic group containing a nitrogen or phosphorus atom may be substituted for any replaceable hydrogen atom in W.

$Y^1$, $Y^2$, $Y^3$ and $Y^4$ are linkers which link carbodiimide groups to B, A or X, and each independently represent a functional group represented by the formula (II). In the general formula (II), L represents a functional group selected from the group consisting of —CH$_2$—, —NHCO—, —CONH—, —O—, —S—, —NR$^1$—, —NR$^2$R$^3$—, —COO—, —OCO—, —NHSO$_2$—, —NHC(S)NH— and —SO$_2$NH—; p and q each independently represent an integer of from 0 to 20; and r represents 0 or 1. $R^1$, $R^2$ and $R^3$ have the same meanings as defined for the formula (I).

A direct bond or an alkylene group that has 1–10 carbon atoms in its main chain and may have a methyl group as a side chain may preferably be used as $Y^1$, $Y^2$, $Y^3$ and $Y^4$. This alkylene group is not particularly limited, and known ones can be used. $Y^1$, $Y^2$, $Y^3$ and $Y^4$ may be the alkylene groups bonded through a functional group selected from the group consisting of —NHCO—, —CONH—, —O—, —S—, —NR$^1$—, —NR$^2$R$^3$—, —COO—, —OCO—, —NHSO$_2$—, —NHC(S)NH— and —SO$_2$NH—.

Furthermore, a group selected form a carboxyl group, a sulfo group, a phosphono group or a phospho group which have substitution of an alkali metal, an alkaline earth metal or a basic group containing a nitrogen or phosphorus atom may be substituted for any replaceable hydrogen atom present in each of $Y^1$, $Y^2$, $Y^3$ and $Y^4$.

B represents a hydrogen atom or a monovalent organic group. This monovalent organic group may be either the same as, or different from -W-Y$^1$—[A]$_n$—Y$^4$—X in the formula (I). It is preferably an alkyl group, a tertiary amino group or a quaternary ammonium group, and preferred examples thereof are listed below.

(a) A nitrogen-containing heterocyclic group in which a nitrogen atom may be quaternarized with a hydrogen atom, a saturated or unsaturated aliphatic hydrocarbon group, an aryl group, an aralkyl group, or a fluorescent group-containing organic group, such as a pyridyl group, a pyrrolidinium group, and a piperidinium group.

(b) An amino group in which a nitrogen atom is quaternarized with a hydrogen atom, a saturated or unsaturated aliphatic hydrocarbon group, an aryl group, an aralkyl group, or a fluorescent group-containing organic group, such as dimethylamino group, diethylamino group, and diisopropylamino group.

(c) A heterocyclic tertiary amino group or quaternary ammonium group represented by the following general formula (XII) or (XIII):

wherein, $R^{11}$ and $R^{12}$ each independently represent a hydrogen atom, a linear or branched saturated or unsaturated aliphatic hydrocarbon group having 1–10 carbon atoms, an aryl group or an aralkyl group; J represents an anion such as a sulfate ion, an alkylsulfate ion, an arylsulfate ion, a halosulfate ion and a halide ion; $R^{13}$ represents an oxygen atom or an ionized atom thereof, or a methylene group; and m represents 0 or 1.

More specifically, those groups represented by the following formulae can be mentioned:

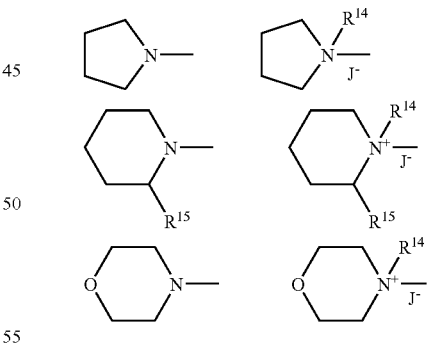

wherein, $R^{14}$ and $R^{15}$ each independently represent a hydrogen atom, an alkyl group having 1–10 carbon atoms, or a phenyl group which may have substitution of an alkyl group having 1–10 carbon atoms.

(d) An alkyl group which may have a substituent, for example, a methyl group, an ethyl group, a n-propyl group, an isopropyl group, a n-butyl group, a sec-butyl group, a tert-butyl group and a cyclohexyl group, an aryl group such as a phenyl group and so forth.

A group selected from a carboxyl group, a sulfo group, a phosphono group and a phospho group which have substitution of an alkali metal, an alkaline earth metal or a basic group containing a nitrogen or phosphorus atom may be substituted for any replaceable hydrogen atom of B.

As described above, in the fluorescent group-containing carbodiimide compound precursor of the present invention having a halogen atom or a sulfonic acid group, which is represented by the general formula (I), any of the functional groups represented by B, $Y^1$, $Y^2$, $Y^3$, $Y^4$, A and W may have a group selected from a carboxyl group, a sulfo group, a phosphono group and a phospho group which have substitution of an alkali metal, an alkaline earth metal or a basic group containing a nitrogen or phosphorus atom. However, it is preferable that at least one functional group selected from these groups has at least one group selected from a carboxyl group, a sulfo group, a phosphono group and a phospho group which have substitution of an alkali metal, an alkaline earth metal or a basic group containing a nitrogen or phosphorus atom.

Specific examples of the carboxyl group, the sulfo group, the phosphono group and the phospho group which have substitution of the alkali metal, the alkaline earth metal or the basic group containing the nitrogen or phosphorus atom are —COONa, —COOK, (—COO)$_2$Mg, (—COO)$_2$Ca, (—COO)$_2$Ba, —COONH$_4$, —COONR$^1$H$_3$, —COONR$^1{}_2$H$_2$, —COONR$^1{}_3$H, —COONR$^1{}_4$, —SO$_3$Na, —SO$_3$NH$_4$, —SO$_3$NR$^1$H$_3$, —SO$_3$NR$^1{}_2$H$_2$, —SO$_3$NR$^1{}_3$H, —SO$_3$NR$^1{}_4$, —PO$_3$Na$_2$, —PO$_3$K$_2$, —PO$_3$Ca, —PO$_3$(NH$_4$)$_2$, —PO$_3$(NR$^1$H$_3$)$_2$, —PO$_3$(NR$^1{}_2$H$_2$)$_2$, —PO$_3$(NR$^1{}_3$H)$_2$, —PO$_3$(NR$^1{}_4$)$_2$, —OPO$_3$Na$_2$, —OPO$_3$K$_2$, —OPO$_3$(NR$^1{}_4$)$_2$ and so forth, where $R^1$ has the same meaning as $R^1$ in the formula (I).

Specific examples of the fluorescent group-containing carbodiimide compound precursor of the present invention represented by the formula (I) include, for example, N-methyl-(3-morpholinopropyl)-N-(hexane-6-iodide)-carbodiimide, N-methyl-(3-morpholinopropyl)-N-(hexane-6-bromide)-carbodiimide, N-methyl-(3-morpholinopropyl)-N-(hexane-6-chloride)-carbodiimide, N-methyl-(3-morpholinopropyl)-N-(hexane-6-tosylate)-carbodiimide, N-methyl-(3-morpholinopropyl)-N-(hexane-6-mesylate)-carbodiimide, N-methyl-(3-morpholinopropyl)-N-propyl (sodium 2-ethylcarboxylate)-3-iodide)-carbodiimide, N-methyl-(3-morpholinopropyl)-N-(propyl-(potassium 2-ethylcarboxylate)-3-iodide)-carbodiimide, N-methyl-(3-morpholinopropyl)-N-(propyl-(sodium 2-propyl-carboxylate)-3-iodide)-carbodiimide, N-methyl-(3-morpholinopropyl)-N-(propyl-(sodium 2-isopropyl-carboxylate)-3-iodide)-carbodiimide and so forth.

(ii) Fluorescent Group-containing Carbodiimide Compound

The fluorescent group-containing carbodiimide compound of the present invention, which has at least one group selected from a carboxyl group, a sulfo group, a phosphono group and a phospho group which have substitution of an alkali metal, an alkaline earth metal or a basic group containing a nitrogen or phosphorus atom, can be obtained by, for example, selecting a carbodiimide compound and a fluorescent group-containing cmpound from the fluorescent group-containing carbodiimide compound precursor having the halogen atom or the sulfonic acid group represented by the general formula (I), and the fluorescent group-containing compound represented by the general formula (VIII), respectively, so that at least one of the carbodiimide compound and the fluorescent group-containing compound should have a functional group selected from a carboxyl group, a sulfo group, a phosphono group and a phospho group which have substitution of an alkali metal, an alkaline earth metal or a basic group containing a nitrogen or phosphorus atom, to allow them to react with each other. The structure of the fluorescent group-containing carbodiimide compound of the present invention is represented by the general formula (III).

The fluorescent group F in the formula (III) is not particularly limited, and any of known fluorescent groups can be used. Specific examples thereof include, for example, those groups derived from anthracene derivatives, coumarin derivatives, pyrene derivatives, perylene derivatives, dansyl derivatives, rhodamine derivatives, oxazole derivatives, benzothiazole derivatives, benzoxadiazole derivatives, boron dipyrromethene difluoride derivatives, thiazole orange derivatives, fluorescent rare earth metal compound derivatives, cyanine derivatives and so forth.

A group selected from a carboxyl group, a sulfo group, a phosphono group and a phospho group which have substitution of an alkali metal, an alkaline earth metal or a basic group containing a nitrogen or phosphorus atom may be substituted for any replaceable hydrogen atom of the fluorescent group.

In the formula (III), Q represents a tertiary or quaternary nitrogen atom or a tertiary or quaternary phosphorus atom. In the formula (III), $R^4$ and $R^5$ each independently represent a hydrogen atom, a linear or branched saturated or unsaturated aliphatic hydrocarbon group having 1–20 carbon atoms, or a cycloalkyl group, an aryl group or an aralkyl group which may have a substituent. However, when one of $R^4$ and $R^5$ is hydrogen atom, the other represents a linear or branched saturated or unsaturated aliphatic hydrocarbon group having 1–20 carbon atoms, or a cycloalkyl group, an aryl group or an aralkyl group which may have a substituent. Further, $R^4$ and $R^5$ may be bonded to each other to form a nitrogen-containing heterocyclic group or a phosphorus-containing heterocyclic group, which may contain oxygen atom, as -Q$^+$ $R^4R^5$—. That is, the Q forms a tertiary or quaternary onium group in combination with $R^4$ and $R^5$ in the form of -Q$^+$R$^4$R$^5$—. Preferred examples of the tertiary or quaternary onium group include those quaternary onium groups mentioned as preferred groups for W.

A group selected from a carboxyl group, a sulfo group, a phosphono group and a phospho group which are substituted with an alkali metal, an alkaline earth metal or a basic group containing a nitrogen or phosphorus atom may be substituted for any replaceable hydrogen atom of $R^4$ and $R^5$.

In the formula (III), B, $Y^1$, $Y^2$, $Y^3$, $Y^4$, A, X, W, $R^2$, $R^3$ and n have the same meanings as defined for the general formula (I). Further, $Y^5$ in the formula (III) has the same meaning as defined for $Y^1$, $Y^2$, $Y^3$ and $Y^4$ in the formula (I).

As described above, in the fluorescent group-containing carbodiimide compound represented by the general formula (III) of the present invention, any of the functional groups represented by B, $Y^1$, $Y^2$, $Y^3$, $Y^4$, $Y^5$, A, W, $R^4$, $R^5$ and F may have a group selected from a carboxyl group, a sulfo group, a phosphono group and a phospho group which have substitution of an alkali metal, an alkaline earth metal or a basic group containing a nitrogen or phosphorus atom. At the same time, at least one functional group selected from these groups necessarily has at least one group selected from a carboxyl group, a sulfo group, a phosphono group and a phospho group which are substituted with an alkali metal, an alkaline earth metal or a basic group containing a nitrogen or phosphorus atom.

For example, in the fluorescent group-containing compound of the present invention represented by the general formula (III), which can be obtained by allowing the fluorescent group-containing carbodiimide compound precursor having the halogen atom or the sulfonic acid group represented by the general formula (I) to react with the fluorescent group-containing carbodiimide compound represented by the general formula (VIII), when at least one functional group selected from B, $Y^1$, $Y^2$, $Y^3$, $Y^4$, A and W derived from the precursor has at least one group selected from a carboxyl group, a sulfo group, a phosphono group and a phospho group which have substitution of an alkali metal, an alkaline earth metal or a basic group containing a nitrogen or phosphorus atom, any of the functional groups represented by $Y^5$, $R^4$, $R^5$ and F derived from the fluorescent group-containing compound may or may not have a group selected from a carboxyl group, a sulfo group, a phosphono group and a phospho group which have substitution of an alkali metal, an alkaline earth metal or a basic group containing a nitrogen or phosphorus atom.

Similarly, when at least one of functional groups represented by $Y^5$, $R^4$, $R^5$ and F derived from the fluorescent group-containing compound has a group selected from a carboxyl group, a sulfo group, a phosphono group and a phospho group which have substitution of an alkali metal, an alkaline earth metal or a basic group containing a nitrogen or phosphorus atom, any of the functional groups represented by B, $Y^1$, $Y^2$, $Y^3$, $Y^4$, A and W derived from the precursor may or may not have a group selected from a carboxyl group, a sulfo group, a phosphono group and a phospho group which have substitution of an alkali metal, an alkaline earth metal or a basic group containing a nitrogen or phosphorus atom.

Specific examples of the fluorescent group-containing carbodiimide compound of the present invention represented by the general formula (III) include, for example, N-methyl-(3-morpholinopropyl)-N-(hexane-6-(N-3-(dimethylaminopropyl)-1-(Rhodamine B)thiourea-potassium salt))-carbodiimide, N-methyl-(3-morpholinopropyl)-N-(hexane-6-(N-3-(dimethylaminopropyl)-1-(Rhodamine B)thiourea-sodium salt))-carbodiimide, N-methyl-(3-morpholinopropyl)-N-(hexane-6-(N-3-(dimethylaminopropyl)-1-(Rhodamine B)thiourea-tetramethylammonium salt))-carbodiimide, N-methyl-(3-morpholinopropyl)-N-(hexane-6-(N-3-(dimethylaminopropyl)-1-fluoresceinethiourea-potassium salt))-carbodiimide, 2-[2-[3-[[1,3-dihydro-1,1-dimethyl-3-(4-sulfobutyl)-2H-indol-2-ylidene]ethylidene]-2-phenoxy-1-cyclohexen-1-yl]-ethenyl]-1,1-dimethyl[3-propylthiourea-N-methyl-(3-morpholinopropyl)-N-(hexane-6-(N-3-(dimethylaminopropyl)-carbodiimide))]1H-benz[e]-indolium salt, N-methyl-(3-morpholinopropyl)-N-(hexane-6-(N-3-(dimethylaminopropyl)-1-(Cascade Blue)aminoethyl-4-azidobenzamide-trisodium salt))-carbodiimide and so forth.

The method for producing the fluorescent group-containing carbodiimide compound of the present invention will be explained hereafter.

(2) Method for Producing Fluorescent Group-containing Carbodiimide Compound

While the method for producing the fluorescent group-containing carbodiimide compound of the present invention is not particularly limited, it is generally produced by selecting a carbodiimide compound and a fluorescent group-containing compound from the fluorescent group-containing carbodiimide compound precursor represented by the general formula (I) and the fluorescent group-containing compound represented by the general formula (VIII), respectively, so that at least one of the carbodiimide compound precursor and the fluorescent group-containing compound should have a functional group selected from a carboxyl group, a sulfo group, a phosphono group and a phospho group which have substitution of an alkali metal, an alkaline earth metal or a basic group containing a nitrogen or phosphorus atom, to allow them to react with each other.

Specifically, the fluorescent group-containing carbodiimide compound of the present invention can be produced by performing (i) a step of producing the fluorescent group-containing carbodiimide compound precursor represented by the general formula (I), (ii) a step of producing the fluorescent group-containing compound represented by the general formula (VIII), and (iii) a step of allowing the fluorescent group-containing carbodiimide compound precursor produced in the step (i) and the fluorescent group-containing compound produced in the step (ii) represented by the general formula (VIII) with each other. In the above production, the fluorescent group-containing carbodiimide compound precursor represented by the general formula (I) and the fluorescent group-containing compound represented by the general formula (VIII) are combined so that at least one of the both compounds should have a functional group selected from a carboxyl group, a sulfo group, a phosphono group and a phospho group which have substitution of an alkali metal, an alkaline earth metal or a basic group containing a nitrogen or phosphorus atom.

(i) Step of Producing Fluorescent Group-containing Carbodiimide Compound Precursor Represented by the Formula (I)

The fluorescent group-containing carbodiimide compound precursor having the halogen atom or the sulfonic acid group used for the present invention can be suitably selected according to a structure of a desired fluorescent group-containing carbodiimide compound. The method for producing such a fluorescent group-containing carbodiimide group-containing compound precursor having a halogen atom or a sulfonic acid group is not particularly limited. For examples it can be produced by (A) preparation of a urea or thiourea compound starting from an isocyanate compound and an amine compound such as a primary amine derivative having a functional group required for conversion into a halogenated derivative or sulfonated derivative, (B) halogenation or sulfonation of the (thio)urea compound, and (C) carbodiimidation of the resulting compound by dehydration or oxidative desulfurization. The steps of (A) to (C) will be explained in detail hereinafter.

(A) Step of Producing (Thio)Urea Compound

Urea compounds can generally be synthesized by a reaction of an amine compound and an isocyanate compound [J. H. Saunders and R. Slocombe, Chem. Rev., 43, 203 (1948)]. Further, it is a common practice that thiourea derivatives are produced by a reaction of an amine compound and an isothiocyanate compound [N. A. Ivanov, R. V. Viasova, V. A. Gancharava, and L. N. Smirnov, Izv. Vyssh. Zaved. Khim. Tekhnol., 19 (7), 1010 (1976)].

The aforementioned methods can also be used for the production method of the present invention. The (thio)urea compound represented by the general formula (VI) can be synthesized by allowing the iso(thio)cyanate compound represented by the general formula (IV) and an amine compound which has a functional group required for the conversion into a halogenated derivative or sulfonated derivative represented by the general formula (V) to react with each other. The (thio)urea compound represented by the general formula (VI) obtained by this reaction also has a functional group required for the conversion into a halogenated derivative or sulfonated derivative, for example, a hydroxyl group, an alkyl group, an alkenyl group, a vinyl group, an allyl group, a phenyl group, a carboxyl group, a sulfonyl group-containing derivative group, a phosphonium group and so forth.

As specific examples of the aforementioned reaction, there can be mentioned, for example, a reaction by mixing the iso(thio)cyanate compound represented by the general formula (IV), such as N-(3-morpholinopropyl) isothiocyanate, N-3-dimethylaminopropyl-N-3-(4-morpholino)-propyl isothiocyanate, 1-ethyl-3,3-dimethylaminopropyl isothiocyanate and bis(3,3-dimethylamino)propyl isothiocyanate, with the amine compound having the functional group required for the conversion into the halogenated derivative or sulfonated derivative represented by the general formula (V), such as 6-aminohexanol, 5-aminopentanol, 4-aminobutanol and 3-aminopentanol, in a known solvent such as dichloromethane, chloroform and dimethylformamide (abbreviated as "DMF" hereinafter). Thus, the (thio)urea compound having the functional group required for the conversion into the halogenated derivative or sulfonated derivative represented by the general formula (VI) can be obtained.

Moreover, besides the aforementioned method, a first amine compound and urea can be condensed to obtain a monosubstituted urea, and the monosubstituted urea can be reacted with a second primary amine having a functional group required for the conversion into a halogenated derivative or sulfonated derivative to obtain a disubstituted urea intermediate [T. L. Davis and K. C. Blanchard, Org. Synth. Coll Vol. 1, 453 (1941)] as the following reaction scheme:

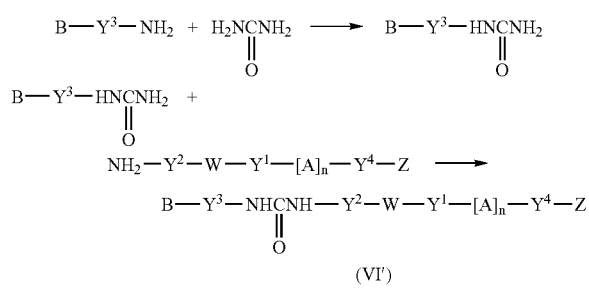

wherein, B, $Y^1$, $Y^2$, $Y^3$, $Y^4$, A, W and n have the same meanings as defined for the general formula (I); T represents an oxygen atom or a sulfur atom; and Z represents a hydroxyl group, an alkyl group, an alkenyl group, a vinyl group, an allyl group, a phenyl group, a carboxyl group, a sulfonyl group-containing derivative group or a phosphonium group.

Moreover, the monosubstituted urea can also be synthesized by a reaction of the first amine compound and cyanic acid or a salt thereof [F. Kurzer Org. Synth. Coll. Vol. 4, 49 (1963)]. Furthermore, it is also possible to use a primary amine having a functional group required for the conversion into a halogenated derivative or sulfonated derivative in the above reactions. In this case, the second amine compound may or may not have a functional group required for the conversion into a halogenated derivative or sulfonated derivative.

In addition, the disubstituted urea derivative can also be directly obtained by a reaction of an amine compound having a functional group required for the conversion into a halogenated derivative or sulfonated derivative and an isocyanate compound.

When the (thio)urea compound represented by the general formula (VI) has a tertiary nitrogen atom or phosphorus atom-containing group, such as a morpholinoalkyl group, a morpholinoalkyl ester group, a morpholinoalkyl ether group, a morpholinoalkylamide group, a morpholinoalkyl ketone group, a morpholinoalkylthiourea group, a trialkylamino group, a (trialkyl ester)amino group, a trialkyl ether group, a trialkylamidoamino group, a (trialkyl ketone)amino group, a trialkylthioureaamino group, a trialkylphosphonium group, a (trialkyl ester)phosphonium group, a (trialkyl ether)phosphonium group, a trialkylamidophosphonium group, a (trialkyl ketone)phosphonium group, and a trialkylthioureaphosphonium group, its water solubility may be improved by making it into a quaternary onium salt through a reaction with methyl p-toluenesulfonate, methyl iodide, dimethyl sulfate and so forth in a known solvent such as DMF.

As explained below, the aforementioned step (A) can also be performed by two stages of (A') a step of producing a urea or thiourea compound starting from an iso(thio)cyanate compound and an amine compound such as primary amine derivatives, and (A") a subsequent step of introducing a functional group required for conversion into a halogenated derivative or sulfonated derivative into the (thio)urea compound.

In this method, a (thio)urea compound represented by the following general formula (IV') is synthesized first in the step (A') through a reaction of an iso(thio)cyanate compound similar to that represented by the general formula (IV) and an amine compound represented by the following general formula (V'). Like the aforementioned reaction, this reaction is also a common reaction of an iso(thio)cyanate compound and an amine compound.

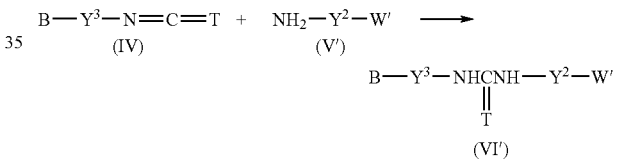

In the formulae, B, $Y^2$ and $Y^3$ have the same meanings as defined for the general formula (I); W' represents a group containing secondary or tertiary nitrogen atom or secondary or tertiary phosphorus atom, which may have substitution of a group selected from a hydroxyl group, an alkyl group, an alkenyl group, a vinyl group, an allyl group, a phenyl group, a carboxyl group, a sulfonyl group-containing derivative group and a phosphonium group; and T represents an oxygen atom or a sulfur atom.

Such a thiourea compound as mentioned below can also be synthesized as the compound represented by the formula (IV') through a reaction of an amine compound and carbon disulfide [W. W. Levis, Jr. and E. A. Waipert, U.S. Pat. No. 3,168,560 (1965)].

In the formulae, B and $Y^3$ have the same meanings as defined for the general formula (I).

In addition, such a disubstituted urea intermediate as mentioned below can be synthesized as the compound represented by the formula (IV') by condensing an amine compound and urea to obtain a monosubstituted urea, and allowing the product to react with a second amine or the same amine [T. L. Davis and K. C. Blanchard, Org. Synth. Coll. Vol. 1, 453 (1941)].

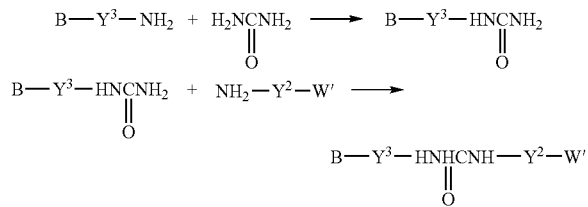

In the formulae, B, $Y^2$ and $Y^3$ have the same meanings as defined for the general formula (I); and W' represents an onium group which may have substitution.

Moreover, the monosubstituted urea can also be synthesized through a reaction of an amine compound and cyanic acid or a salt thereof [F. Kurzer, Org. Synth. Coll. Vol. 4, 49 (1963)].

Then, the step (A") is performed, wherein the (thio)urea compound represented by the general formula (IV') obtained in the aforementioned step (A') is allowed to react with an amine compound having a functional group required for the conversion into a halogenated derivative or sulfonated derivative represented by the general formula (V") to produce the compound represented by the general formula (VI).

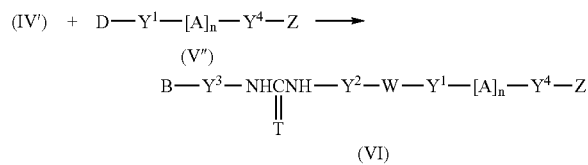

In the formulae, B, $Y^1$, $Y^2$, $Y^3$, $Y^4$, W, A and n have the same meanings as defined for the general formula (I); T represents an oxygen atom or a sulfur atom; D represents a hydroxyl group, a halogen atom or a sulfonyl group-containing derivative group; and Z represents a hydroxyl group, an alkyl group, an alkenyl group, a vinyl group, an allyl group, a phenyl group, a carboxyl group, a sulfonyl group-containing derivative group or a phosphonium group.

As described above, the (thio)urea compound represented by the general formula (VI), which has a functional group required for the conversion into a halogenated derivative or sulfonated derivative, can be obtained in the step (A), through the aforementioned one-step reaction process, or the two-step reaction process of the steps (A') and (A").

(B) Step of Halogenation or Sulfonation

As to the method for introducing a halogen atom into the (thio)urea compound represented by the general formula (VI), when a hydroxyl group has been introduced into the (thio)urea compound, the halogen atom can be introduced into the (thio)urea compound by, for example, mixing the (thio)urea compound with a halogenation reagent, for example, a hydrogen halide, a sodium halide, a potassium halide, a phosphorus halide, halogenated phosphonic acid triester, a phosphine halide, a thionyl halide, an acid halogen compound and so forth in a known solvent such as DMF, benzene and pyridine to allow them to react with each other [O. Kamm C. S. Marvel, Org. Syhth., 1, 25 (1941); T. A. Wnuk, P. Kovacic, J. Am. Chem. Soc., 97, 5807 (1975); J. D. Bartleson, R. E. Burk, H. P. Lankelma, J. Am. Chem. Soc., 68, 2513 (1946); K. Friedlich, H. K. Thieme, Synthesis, 111(1973); H. Stone, H. Shechter, Org. Synth., 4, 323 (1963); T. H. Bevan, T. Malkin, D. B. Smith, J. Chem. Soc., 1383 (1955)].

Specific examples of the halogenation reagent include hydrobromic acid, sodium bromide, zinc chloride, phosphorus tribromide, phosphorus trichloride, potassium iodide, methyltriphenylphosphonic acid iodide, iodine, sodium iodide, methanesulfonyl chloride, triphenylphosphine dibromide, triphenylphosphine dichloride, triphenylphosphine diiodide, thionyl chloride, thionyl bromide and so forth.

Further, as to the method for introducing a sulfonic acid group into the (thio)urea compound represented by the general formula (VI), when a hydroxyl group has been introduced into the (thio)urea compound, the sulfonic acid group can be introduced into the (thio)urea compound by, for example, mixing the compound with a sulfonation reagent such as a sulfonic acid halide in a known solvent such as dichloromethane and chloroform to allow them to react with each other.

Specific examples of the sulfonation reagent include benzenesulfonic acid chloride, p-toluenesulfonic acid chloride, methanesulfonic acid chloride, benzenesulfonic acid bromide, p-toluenesulfonic acid bromide, methanesulfonic acid bromide and so forth.

Thus, a halogenated or sulfonated derivative of the (thio)urea compound represented by the general formula (VII) can be obtained by halogenating or sulfonating the (thio)urea compound represented by the general formula (VI).

(C) Step of Dehydration or Oxidative Desulfurization

In the production method of the present invention, the fluorescent group-containing carbodiimide compound precursor represented by the general formula (I) of the present invention can be derived from the compound represented by the general formula (VII) by subjecting it to dehydration or oxidative desulfurization reaction.

The dehydration reaction is used for the urea compound containing an oxygen atom as T among the compounds represented by the general formula (VII), and it can be performed by heating the urea compound with p-toluenesulfonic acid chloride in a tertiary amine compound [G. Amiard and R. Heymers, Bull. Soc. Chim. Fr., 1360 (1956)]. Further, it can also be performed by using p-toluenesulfonic acid chloride and potassium carbonate in the presence of a quaternary ammonium salt [Zsuzsa M. Jaszay., Synthesis, 520 (1987)].

As for the thiourea compounds containing a sulfur atom as T among the compounds represented by the general formula (VII), oxidative desulfurization reaction is performed in order to obtain the fluorescent group-containing carbodiimide compound precursor of the present invention. In general, mercury oxide is used for the oxidative desulfurization reaction as a desulfurization agent. Besides mercury oxide, lead oxide [F. Zetzehe and A. Fredrich, Chem. Ber., 73, 1114 (1940)], zinc oxide (R. F. Coles, U.S. Pat. No. 2,946,819 (1960)], lead carbonate, lead nitrate, lead chloride [J. C. Sheehan, U.S. Pat. No. 3,135,748 (1964)] and so forth can also be used. Furthermore, sodium hypochlorite may also be used under an alkaline condition [H. Stetter and C. Wulff, Chem. Ber., 95, 2302 (1962)].

Although the fluorescent group-containing carbodiimide compound precursor of the present invention having the halogen atom or the sulfonic acid group, which is represented by the general formula (I), can be produced as described above, the aforementioned production method is a mere example, and the order of the process steps is not limited to that mentioned above. For example, either of the halogenation or sulfonation and the carbodiimidation may precede the other process step.

Further, when the step (A) is performed by a reaction process of two steps, steps (A') and (A"), it is also possible to produce the fluorescent group-containing carbodiimide compound precursor of the present invention having the halogen atom or the sulfonic acid group, which is represented by the general formula (I), by carbodiimidating the compound represented by the general formula (VI') obtained in the step (A'), introducing, into the compound, a functional group required for the conversion into a halogen derivative or a sulfone derivative in the step (A"), and finally subjecting the compound to the halogenation step.

Thus, there is obtained the fluorescent group-containing carbodiimide compound precursor of the present invention having the halogen atom or the sulfonic acid group, which is represented by the general formula (I). In the general formula (I), a group selected from a carboxyl group, a sulfo group, a phosphono group and a phospho group which have substitution of an alkali metal, an alkaline earth metal or a basic group containing a nitrogen or phosphorus atom replaceable hydrogen atoms may be substituted for any replaceable hydrogen atom present on any of the functional groups represented by B, $Y^1$, $Y^2$, $Y^3$, $Y^4$, A and W.

The aforementioned group selected from a carboxyl group, a sulfo group, a phosphono group and a phospho group which have substitution of an alkali metal, an alkaline earth metal or a basic group containing a nitrogen or phosphorus atom may be contained in a raw material compound used for the production of the fluorescent group-containing carbodiimide compound precursor represented by the general formula (I) described above, or it may be introduced into the raw material compound at the first stage of the production, or it may be introduced into an intermediate compound during the production, when the raw material compound does not contain the group. Furthermore, when a finally obtained fluorescent group-containing carbodiimide compound precursor represented by the general formula (I) does not contain such a group, it may further be introduced into the final compound.

In order to introduce the group, for example, a compound having a group selected from a carboxyl group, a sulfo group, a phosphono group and a phospho group, and a functional group for the introduction of the group can be made into an alkali metal salt such as potassium salt, an alkaline earth metal salt such as calcium and magnesium salt, or a salt with a basic group containing a nitrogen or phosphorus atom at the carboxyl group, the sulfo group, the phosphono group or the phospho group, and introduced into a raw material or an intermediate of the fluorescent group-containing carbodiimide compound precursor, or the final product. Alternatively, the compound having a carboxyl group, a sulfo group, a phosphono group, a phospho group or the like not made into a salt can also be introduced into the raw material or the intermediate of the precursor, or the final product, and then the functional groups may be converted into such salts as mentioned above.

When the raw material of the precursor is a compound having a group selected from a carboxyl group, a sulfo group, a phosphono group and a phospho group, it may be converted into an alkali metal salt, an alkaline earth metal salt, or a salt of a basic group containing a nitrogen or phosphorus atom, and then used for the production process. Alternatively, the carboxyl group, the sulfo group, the phosphono group and the phospho group of the raw material may not be converted into a salt, and the raw material may be used as it is for the production process, and those functional groups of a compound obtained after an appropriate step can be converted into a salt.

The method for converting the aforementioned compound into an alkali metal salt, an alkaline earth metal salt or a salt of a basic group containing a nitrogen or phosphorus atom salt at the carboxyl group, the sulfo group, the phosphono group or the phospho group possessed by the compound is not particularly limited. Any known methods can be used for it.

Specifically, a method comprising adding a known solvent such as water and alcohol to the compound having a group selected from a carboxyl group, a sulfo group, a phosphono group and a phospho group, to dissolve the compound in the solvent, and then adding to the obtained solution, sodium hydroxide, potassium hydroxide, calcium hydroxide, sodium carbonate, potassium carbonate, sodium hydrogencarbonate, tetramethylammonium hydroxide, tetramethylammonium chloride, tetramethylammonium bromide, tetramethylammonium iodide or the like, and mixing to allow to cause reaction.

(ii) Step of Producing Fluorescent Group-containing Compound Represented by the General Formula (VIII)

The fluorescent group-containing compound represented by the general formula (VIII) which is usable for producing the fluorescent group-containing carbodiimide compound of the present invention that has a group selected from a carboxyl group, a sulfo group, a phosphono group and a phospho group which have substitution of an alkali metal, an alkaline earth metal or a basic group containing a nitrogen or phosphorus atom, by allowing the fluorescent group-containing compound represented by the general formula (VIII) to react with the fluorescent group-containing carbodiimide compound precursor having the halogen atom or the sulfonic acid group obtained in the aforementioned (i), can be selected depending on desired fluoresent group-containing carbodiimide compounds.

In order to obtain the fluorescent group-containing compound represented by the general formula (VIII), a group containing a secondary or tertiary nitrogen atom or a secondary or tertiary phosphorus atom can be introduced into a suitable fluorescent group-containing compound containing a fluorescent group F according to a usual method. Examples of the fluorescent group-containing compound include anthracene derivatives, coumarin derivatives, pyrene derivatives, perylene derivatives, dansyl derivatives, rhodamine derivatives, oxazole derivatives, benzothiazole derivatives, benzoxadiazole derivatives, boron dipyrromethene difluoride derivatives, thiazole orange derivatives, fluorescent rare earth metal compound derivatives, cyanine derivatives and so forth. The method for producing the fluorescent group-containing compound represented by the general formula (VIII), which contains the fluorescent group F and the group containing the secondary or tertiary nitrogen atom or the secondary or tertiary phosphorus atom, is not particularly limited.

As a specific example, a method for producing a compound having —$(CH_2)_p$—NHC(S)NH—$(CH_2)_q$— as $Y^5$ in the general formula (VIII) is shown below. This reaction is a usual method comprising a reaction of a compound containing an isothiocyanate group and a fluorescent group, and an amine compound having a secondary or tertiary nitrogen or phosphorus atom.

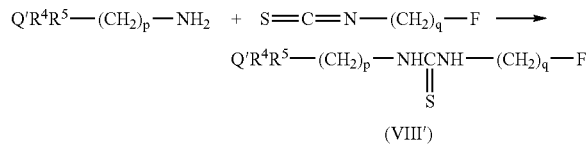

$$Q'R^4R^5\text{—}(CH_2)_p\text{—}NHCNH\text{—}(CH_2)_q\text{—}F$$
$$\underset{S}{\|}$$

(VIII')

In the formulae, $R^4$, $R^5$ and F have the same meanings as defined for the formula (III); and Q' has the same meaning as defined for the formula (VIII).

As further specific examples, there can be mentioned methods comprising mixing fluorescein isothiocyanate, Rhodamine B isothiocyanate, 2-[2-[3-[[1,3-dihydro-1,1-dimethyl-3-(4-sulfobutyl)-2H-indol-2-ylidene]ethylidene]-2-phenoxy-1-cyclohexen-1-yl]-ethenyl]-1,1-dimethyl[3-propyl isothiocyanate] 1H-benz[e]-indolium salt or the like with an amine derivative having a primary or tertiary amino group such as N-3-dimethylaminopropyl-N-3-(4-morpholino)propylene, 1-ethyl-3,3-dimethylaminopropylene, bis-(3,3-dimethyl)aminopropylene and bis(3,3-dimethylamino)propylene in a known solvent such as dichloromethane, chloroform and DMF, to react them each other.

As described above, the fluorescent group-containing compound represented by the general formula (VIII) can be obtained. A carboxyl group, a sulfo group, a phosphono group and a phospho group which have substitution of an alkali metal, an alkaline earth metal or a basic group containing a nitrogen or phosphorus atom may be substituted for replaceable hydrogen atoms present in any of the functional groups represented by $Y^5$, $R^4$, $R^5$ and F in the general formula (VIII).

In the production of the fluorescent group-containing compound represented by the general formula (VIII), the group selected from the carboxyl group, the sulfo group, the phosphono group and the phospho group which have substitution of the alkali metal, the alkaline earth metal or the basic group containing the nitrogen or phosphorus atom may be contained in a raw material, or introduced into a raw material in the first stage of the production when the raw material does not contain the group, or introduced into an intermediate during the production. Furthermore, when the fluorescent group-containing compound represented by the general formula (VIII) finally obtained does not contain such a group, the group may be introduced into the compound after its production.

The introduction of the group may be attained in the same manner as the case of the aforementioned fluorescent group-containing carbodiimide compound precursor. When the raw material contains a group selected from a carboxyl group, a sulfo group, a phosphono group and a phospho group, it can be treated in a manner similar to the case of the aforementioned fluorescent group-containing carbodiimide compound precursor. Further, a compound having a group selected from a carboxyl group, a sulfo group, a phosphono group and a phospho group can be converted into a salt with an alkali metal, an alkaline earth metal or a basic group containing a nitrogen or phosphorus atom at those functional groups in the same manner as described above.

(iii) Step of Allowing Fluorescent Group-containing Carbodiimide Compound Precursor Produced in Step (i) and Fluorescent Group-containing Compound Represented by the General Formula (VIII) Produced in the Step (ii) to React with Each Other The fluorescent group-containing carbodiimide compound of the present invention having at least one group selected from a carboxyl group, a sulfo group, a phosphono group and a phospho group which have substitution of an alkali metal, an alkaline earth metal or a basic group containing a nitrogen or phosphorus atom, which is represented by the general formula (III), can be produced by allowing the fluorescent group-containing carbodiimide compound precursor represented by the general formula (I) produced in step (i) and the fluorescent group-containing compound represented by the general formula (VIII) produced in the step (iii) to react with each other.

At least one of the fluorescent group-containing carbodiimide compound precursor having the halogen atom or the sulfonic acid group represented by the general formula (I) and the fluorescent group-containing compound represented by the general formula (VIII) must necessarily be a compound containing at least one group selected from a carboxyl group, a sulfo group, a phosphono group and a phospho group which have substitution of an alkali metal, an alkaline earth metal or a basic group containing a nitrogen or phosphorus atom.

That is, when the fluorescent group-containing carbodiimide compound precursor having the halogen atom or the sulfonic acid group has at least one group selected from a carboxyl group, a sulfo group, a phosphono group and a phospho group which have substitution of an alkali metal, an alkaline earth metal or a basic group containing a nitrogen or phosphorus atom, i.e., when at least one functional group selected from B, $Y^1$, $Y^2$, $Y^3$, $Y^4$, A and W in the general formula (I) has at least one group selected from a carboxyl group, a sulfo group, a phosphono group and a phospho group which have substitution of an alkali metal, an alkaline earth metal or a basic group containing a nitrogen or phosphorus atom, the fluorescent group-containing compound represented by the general formula (VIII) may or may not have the aforementioned functional group.

Similarly, when the fluorescent group-containing compound represented by the general formula (VIII) has at least one group selected from a carboxyl group, a sulfo group, a phosphono group and a phospho group which have substitution of an alkali metal, an alkaline earth metal or a basic group containing a nitrogen or phosphorus atom, i.e., when at least one functional group selected from $Y^5$, $R^4$, $R^5$ and F in the general formula (VIII) has at least one group selected from a carboxyl group, a sulfo group, a phosphono group and a phospho group which have substitution of an alkali metal, an alkaline earth metal or a basic group containing a nitrogen or phosphorus atom, the fluorescent group-containing carbodiimide compound precursor having the halogen atom or the sulfonic acid group represented by the formula (I) may or may not have the aforementioned functional group.

The method for such a reaction of the fluorescent group-containing carbodiimide compound precursor having the halogen atom or the sulfonic acid group represented by the general formula (I) and the fluorescent group-containing compound represented by the general formula (VIII) as mentioned above is not particularly limited. Specifically, the production can be attained by mixing the both compounds in an appropriate ratio in a known solvent such as dichloromethane, chloroform and DMF, to allow them to react with each other.

When the fluorescent group-containing carbodiimide compound of the present invention is produced, for example, even if the fluorescent group-containing compound has a functional group such as a carboxyl group, a sulfo group, a phosphono group and a phospho group in its structure, a carbodiimide group can be introduced without removing the functional group from the compound beforehand and with leaving it in the form of a salt, by using the fluorescent group-containing carbodiimide compound precursor which has the halogen or the sulfonic acid group, which is represented by the general formula (I). Thus, it enables the production with fewer process steps as compared with conventional methods.

Moreover, a carbodiimide group can easily be introduced into a commercially available fluorescent group-containing compound containing a functional group such as a carboxyl group, a sulfo group, a phosphono group and a phospho group in its structure, by converting the functional group into a salt. Therefore, kinds of usable fluorescent group-containing compounds can be extremely increased.

The fluorescent group-containing carbodiimide compound of the present invention obtained by the method described above can be suitably used as a labeling substance in methods for detecting nucleic acids or immunoassay methods. In these applications, the fluorescent group-containing carbodiimide compound of the present invention can be bonded to a nucleic acid such as DNA or a protein such as antigen and an antibody to be labeled by bringing the fluorescent group-containing carbodiimide compound into contact with the nucleic acid or the protein by, for example, mixing them in a solvent. That is, by bonding the fluorescent group-containing carbodiimide compound of the present invention to a nucleic acid or a protein via the carbodiimide group, which is highly reactive with nucleic acid bases, a fluorescent substance functioning as a highly sensitive detection reagent can be added to the nucleic acid or the protein to serve as a label. Therefore, when the fluorescent group-containing carbodiimide compound of the present invention is bonded to a nucleic acid or a protein, it is preferable that the both should be brought into contact under a condition that allows easy reaction of the carbodiimide group, for example, an alkaline condition of about pH 7.5 to about pH 8.5. Furthermore, the fluorescent group-containing carbodiimide compound of the present invention can also be used for chemiluminescence analysis methods and so forth.

Moreover, in the fluorescent group-containing carbodiimide compound of the present invention, the carbodiimide group can exist in one system together with salts of functional groups such as a carboxyl group, a sulfo group, a phosphono group and a phospho group. Therefore, it has sufficiently improved in water-solubility compared with conventional fluorescent group-containing carbodiimide compounds, and it is advantageous when it is used as a labeling substance in the aforementioned methods for detecting nucleic acids or immunoassay methods as well as chemiluminescence analysis methods and so forth.

(3) Method for Detecting Nucleic Acid of the Present Invention

The fluorescent group-containing carbodiimide compound of the present invention having at least one group selected from the carboxyl group, the sulfo group, the phosphono group and the phospho group which have substitution of the alkali metal, the alkaline earth metal or the basic group containing the nitrogen or phosphorus atom can be used as a labeling substance in a method for detecting a nucleic acid by hybridization using a nucleic acid labeled with a labeling substance. That is, a nucleic acid labeled with the fluorescent group-containing carbodiimide compound can be used as a probe for hybridization. A nucleic acid to be analyzed can be detected by hybridizing the probe with the nucleic acid to be analyzed so that a nucleic acid/nucleic acid hybrid should be formed, eliminating any free probe from the system, and detecting the labeling substance contained in the hybrid. According to the present invention, the fluorescent group-containing carbodiimide compound serving as a labeling substance can be directly detected by measuring fluorescence intensity or the like by using a spectrophotofluorometer, a spectrophotofluorometer for a 96-well microtiter plate, a fluorescence microscope and so forth. The nucleic acid to be measured is usually used as fixed on a membrane such as nylon membranes and cellulose nitrate membranes or a microtiter plate.

The hybridization used in the method for detecting the nucleic acid of the present invention does not particularly differ from usual hybridization of nucleic acids such as colony hybridization, plaque hybridization, dot blot hybridization, Southern hybridization and Northern hybridization, except that the hybridization of the method for detecting the nucleic acid of the present invention uses the fluorescent group-containing carbodiimide compound for the label of a nucleic acid probe. The nucleic acid to be measured may be either RNA or DNA, and the nucleic acid used for a probe may also be either RNA or DNA.

While the labeling of a nucleic acid used for a probe is preferably performed by labeling a polynucleotide or oligonucleotide by the method described above, it can also be attained by incorporating a labeled nucleotide into a polynucleotide or oligonucleotide through a polymerase reaction.

EXAMPLES

Hereafter, the present invention will be explained with reference to the following examples.

Example 1

(1) Production of Fluorescent Group-containing Carbodiimide Compound Precursor Represented by the General Formula (I)

N-(3-Morpholinopropyl) isothiocyanate (1.68 g, 10 mmol) was dissolved in 15 ml of dry methylene chloride, and cooled on a water bath. To the solution, 6-aminohexanol (1.17 g, 10 mmol) was added, and the mixture was stirred overnight at room temperature. After addition of water to the reaction mixture, the mixture was extracted with methylene chloride. The extract was dried over anhydrous magnesium sulfate, filtered through Celite, and concentrated to obtain Compound (I-I-A) (2.7 g, yield: 95%). The NMR spectrum data are shown below.

$^1$H-NMR (CDCl$_3$): $\delta$=1.35–1.85 (m, 12H), $\delta$=2.40–2.60 (m, 6H), $\delta$=3.45 (br, 2H), $\delta$=3.65 (t, 2H), $\delta$=3.75 (t, 4H)

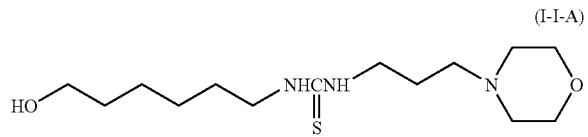

(I-I-A)

Then, the obtained Compound (I-I-A) (2.0 g, 4.87 mmol) was dissolved in dry DMF (5 ml). Methyl iodide (0.691 g, 4.87 mmol) was added to the solution, and the mixture was stirred overnight at room temperature. After the reaction mixture was concentrated, ether/methanol was added thereto and the mixture was decanted to obtain Compound (I-I-B) (2.6 g, yield: 97%). The NMR spectrum data are shown below.

$^1$H-NMR (DMSO): δ=1.25–1.65 (m, 10H), δ=1.75 (t, 2H), δ=2.30–2.45 (m, 2H), δ=2.65 (s, 3H), δ=3.20–3.50 (m, 6H), δ=3.60 (t, 4H), δ=3.75 (br, 2H)

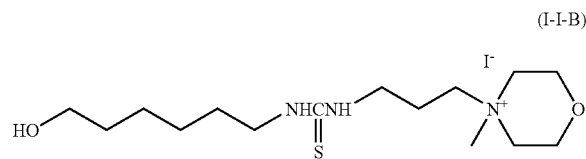

(I-I-B)

Then, the obtained compound (I-I-B) (2 g, 3.62 mmol) was dissolved in DMF (5 ml). Methyl-(triphenyl)-phosphonium iodide (3.27 g, 7.23 mmol) was added thereto, and the mixture was stirred at room temperature for 3 hours. Then, methanol (5 ml) was added thereto, and the mixture was stirred for 20 minutes. Further, this reaction mixture was concentrated, and purified by silica gel chromatography (developing solvent: chloroform/methanol=50/1) to isolate Compound (I-I-C) (2.98 g, yield: 95%). The NMR spectrum data are shown below.

$^1$H-NMR (CDCl$_3$): δ=1.30–1.90 (m, 10H), δ=2.25 (t, 2H), δ=2.85–3.00 (m, 6H), δ=2.95 (s, 3H), δ=3.20 (t, 2H), δ=3.45 (br, 2H), δ=3.90 (t, 4H)

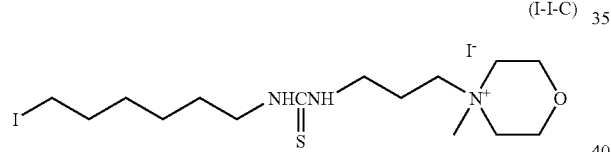

(I-I-C)

Then, the obtained Compound (I-I-C) (2 g, 2.31 mmol) was dissolved in acetone (5 ml). Zinc oxide (1 g, 4.62 mmol) was added thereto, and the mixture was stirred for 3 hours under reflux. The reaction mixture was cooled by leaving it for 1 hour, then decanted, and concentrated to obtain Compound (I-I-D) (1.73 g, yield: 90%). This compound is one of the fluorescent group-containing carbodiimide compound precursors of the present invention. The NMR spectrum data and IR spectrum data are shown below.

$^1$H-NMR (CDCl$_3$): δ=1.30–1.90 (m, 10H), δ=2.40–2.50 (m, 8H), δ=3.15 (s, 3H), δ=3.20 (t, 2H), δ=3.30 (t, 4H), δ=3.75 (t, 4H).

IR: 2127 cm$^{-1}$ (—N=C=N— group)

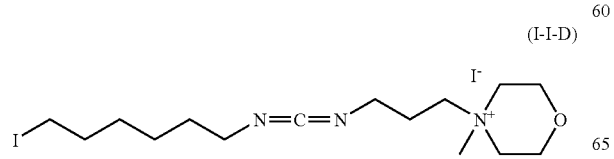

(I-I-D)

(2) Production of Fluorescent Group-containing Compound Represented by the General Formula (VIII)

Rhodamine B isothiocyanate (2.00 g, 3.73 mmol, produced by Sigma) was dissolved in dichloromethane. Ater this reaction mixture was cooled to 0° C., N-3-(dimethylaminopropyl)amine (0.57 g, 5.60 mmol) was gradually added thereto, and the mixture was stirred for 30 minutes. After this reaction mixture was concentrated, ether/methanol was further added thereto, and the mixture was decanted to obtain Compound (I-II-A) (2.26 g, yield: 95%). The NMR spectrum data are shown below.

$^1$H-NMR (CDCl$_3$): δ=1.00–1.20 (m, 8H), δ=2.20–2.60 (m, 6H), δ=2.20 (s, 6H), δ=3.25–3.70 (m, 4H), δ=6.30–8.00 (m, 9H)

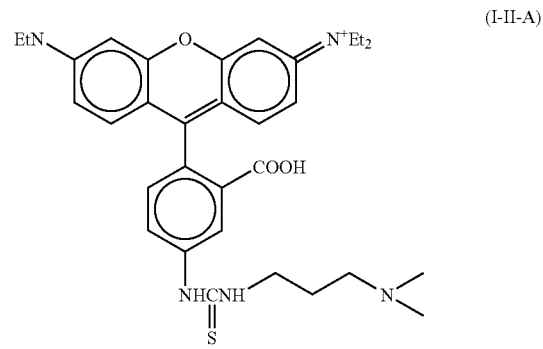

(I-II-A)

The obtained Compound (I-II-A) (2.26 g, 3.54 mmol) was dissolved in methanol. A saturated solution of potassium hydroxide in isopropyl alcohol (about 15 ml) was added thereto to allow deposition of solid matter. Then, it was filtered by using ethanol, and dried to obtain Compound (I-II-B) (2.30 g, yield: 96%). This compound corresponded to the compound (I-II-A) in which the carboxyl group in the Rhodamine B group was made into a potassium salt (—COOK). The NMR spectrum data are shown below.

$^1$H-NMR (CDCl$_3$): δ=1.00–1.20 (m, 8H), δ=2.20–2.60 (m, 6H), δ=2.20 (s, 6H), δ=3.25–3.70 (m, 4H), δ=6.30–8.00 (m, 9H).

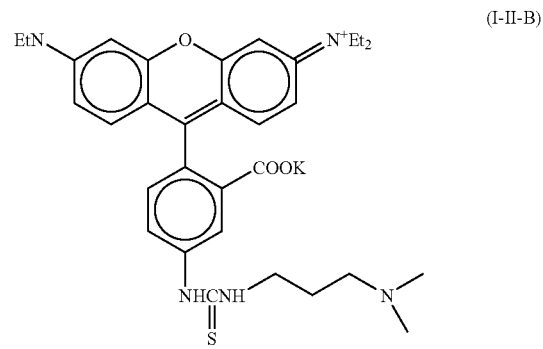

(I-II-B)

(3) Production of Fluorescent Group-containing Carbodiimide Compound Represented by the General Formula (III)

Compound (I-I-D) obtained in (1) (1.23 g, 1.48 mmol) and Compound (I-II-B) obtained in (2) (1 g, 1.48 mmol) were dissolved in DMF, and the solution was stirred overnight at room temperature. To the reaction mixture, ether/methanol was added and the mixture was decanted to obtain Compound (1) (2.10 g, yield: 94%) as the fluorescent group-containing carbodiimide compound of the present invention. The NMR spectrum data, IR spectrum data, and UV spectrum data are shown below.

$^1$H-NMR (CDCl$_3$): δ=1.00–1.85 (m, 18H), δ=2.40–2.55 (m, 12H), δ=2.85 (s, 3H), δ=2.90 (s, 6H), δ=3.15 (t, 2H), δ=3.25 (t, 4H), δ=3.50–3.65 (m, 6H), δ=3.75 (t, 4H), δ=6.30–8.00 (m, 9H).

IR: 2125 cm$^{-1}$ (—N=C=N— group).

UV (EtOH): λ$_{max}$ 542 nm

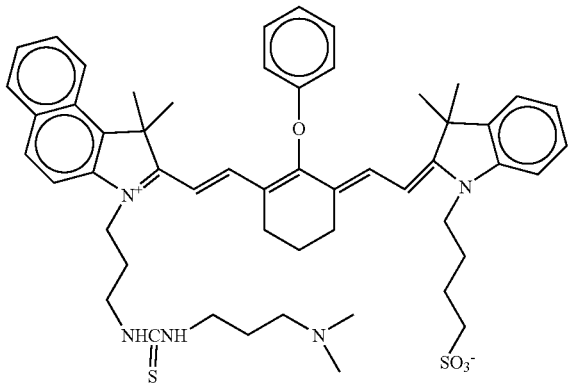

(II-I-A)

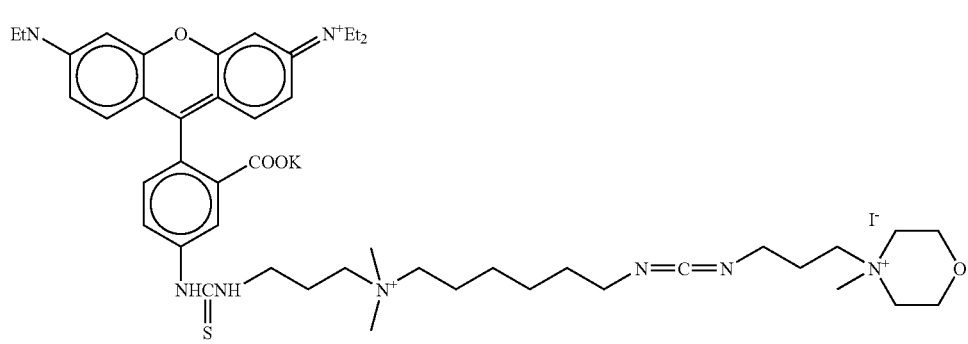

(1)

Example 2

(1) Production of Fluorescent Group-containing Compound Represented by the General Formula (VIII)

2-[2-[3-[[1,3-Dihydro-1,1-dimethyl-3-(4-sulfobutyl)-2H-indol-2-ylidene]ethylidene]-2-phenoxy-1-cyclohexen-1-yl]-ethenyl]-1,1-dimethyl[3-propyl isothiocyanate] 1H-benz[e]-indolium salt (400 mg, 0.502 mmol, produced by LI-COR) was dissolved in dichloromethane (10 ml). After the solution was cooled to 0° C., N-3-(dimethylaminopropyl) amine (76.9 mg, 0.753 mmol) was gradually added thereto, and the mixture was stirred at room temperature for 1.5 hours. After this reaction solution was concentrated, ether/methanol was added, and the mixture was decanted to obtain Compound (II-I-A) (402 mg, yield: 89%). The NMR spectrum data are shown below.

$^1$H-NMR (CDCl$_3$): δ=1.20–2.40 (m, 14H), δ=2.25 (s, 6H), δ=2.45 (t, 2H), δ=2.65–3.05 (m, 4H), δ=3.65–3.95 (m, 4H), δ=4.45 (t, 2H), δ=6.13 (d, 1H), δ=6.35 (d, 1H), δ=6.90–7.60 (m, 11H), δ=7.70–8.15 (m, 5H)

(2) Production of Fluorescent Group-containing Carbodiimide Compound Represented by the General Formula (III)

Compound (I-I-D) obtained in the Example 1 (1) (232 mg, 0.445 mmol) and Compound (II-I-A) obtained in the Example 2 (1) (400 mg, 0.445 mmol) were dissolved in DMF (10 ml), and the solution was stirred overnight at room temperature. To the reaction mixture, ether/methanol was further added and the mixture was decanted to obtain Compound (2) (575 mg, yield: 91%) as the fluorescent group-containing carbodiimide compound of the present invention. The NMR spectrum data, IR spectrum data, and UV spectrum data are shown below.

$^1$H-NMR (CDCl$_3$): δ=1.20–2.10 (m, 24H), δ=2.30–2.50 (m, 12H), δ=3.10–3.35 (m, 4H), δ=2.90 (s, 3H), δ=2.95 (s, 6H), δ=3.60–3.85 (m, 10H), δ=6.13 (d, 1H), δ=6.35 (d, 1H), δ=6.80–7.60 (m, 11H), δ=7.80–8.18 (m, 5H).

IR: 2127 cm$^{-1}$ (—N=C=N— group).

UV (EtOH): λ$_{max}$ 790 nm

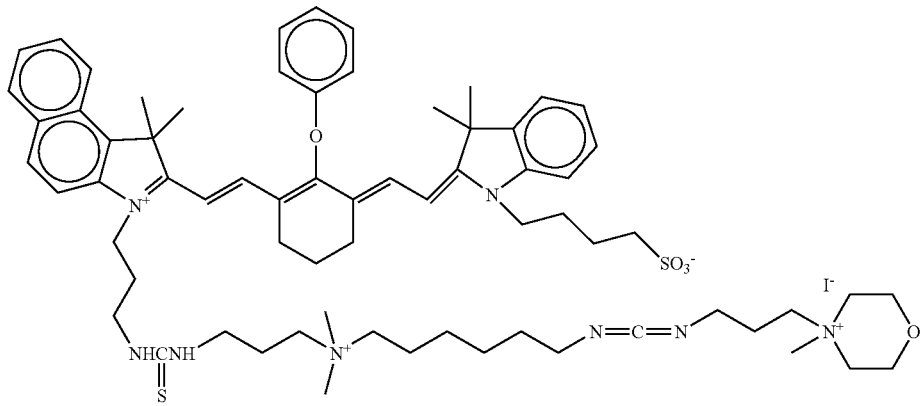

(2)

Example 3

(1) Production of Fluorescent Group-containing Compound Represented by the General Formula (VIII)

Cy3.18.OSu (200 mg, 0.175 mmol) produced by referring to Japanese Patent Application Laid-open No. 9-325147 and Ratnakaer B. Mujumdar et. al., Bioconjugate Chem., 4, 2, 105–111 (1993) was dissolved in DMF (5 ml). After the reaction solution was cooled to 0° C., N-3-(dimethylamino-propyl)amine (71.4 mg, 0.698 mmol) was gradually added thereto, and the mixture was stirred at room temperature for 12 hours. After this reaction solution was concentrated, ethyl acetate/methanol was added thereto, and the mixture was decanted several times to obtain Compound (III-I-A) (170 mg, yield: 87%). The NMR spectrum data are shown below.

$^1$H-NMR (DMSO): δ=1.30–1.60 (m, 12H), δ=1.70 (s, 12H), δ=2.05 (t, 4H), δ=2.10–2.30 (m, 8H), δ=2.15 (s, 12H), δ=2.95 (q, 4H), δ=4.12 (t, 4H), δ=6.54 (d, 2H), δ=7.36–7.95 (m, 6H), δ=8.36 (t, 1H).

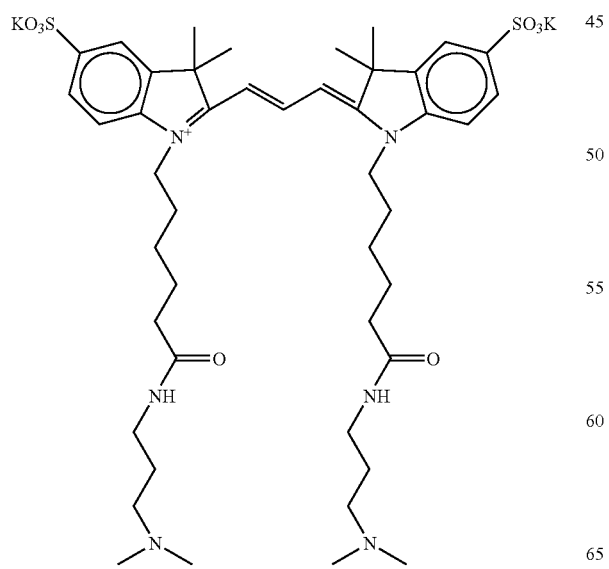

(III-I-A)

(2) Production of Fluorescent Group-containing Carbodiimide Compound Represented by the General Formula (III)

Compound (I-I-D) (79 mg, 0.152 mmol) obtained in the Example 1 (1) and Compound (III-I-A) (170 mg, 0.152 mmol) obtained in the Example 3 (1) were dissolved in DMF (10 ml), and the solution was stirred overnight at room temperature. To the reaction mixture, ethyl acetate/methanol was furthere added and the mixture was decanted to obtain Compound (3) (249 mg, yield: 100%) as the fluorescent group-containing carbodiimide compound of the present invention. The NMR spectrum data, IR spectrum data, and UV spectrum data are shown below.

$^1$H-NMR (DMSO): δ=1.10–1.80 (m, 24H), δ=1.70 (s, 12H), δ=2.05 (m, 4H), δ=2.10–2.30 (m, 8H), δ=2.15 (s, 6H), δ=2.72 (s, 3H), δ=2.85 (s, 3H), δ=2.85–3.50 (m, 12H), δ=3.55 (m, 4H), δ=4.12 (t, 4H), δ=6.54 (d, 2H), δ=7.36–7.95 (m, 6H), δ=8.36 (t, 1H).

IR: 2127 cm$^{-1}$ (—N=C=N— group).

UV (EtOH): λ$_{max}$ 532 nm

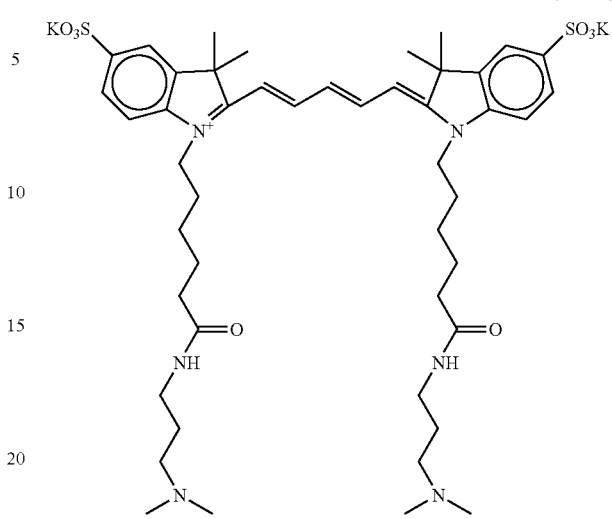

(IV-I-A)

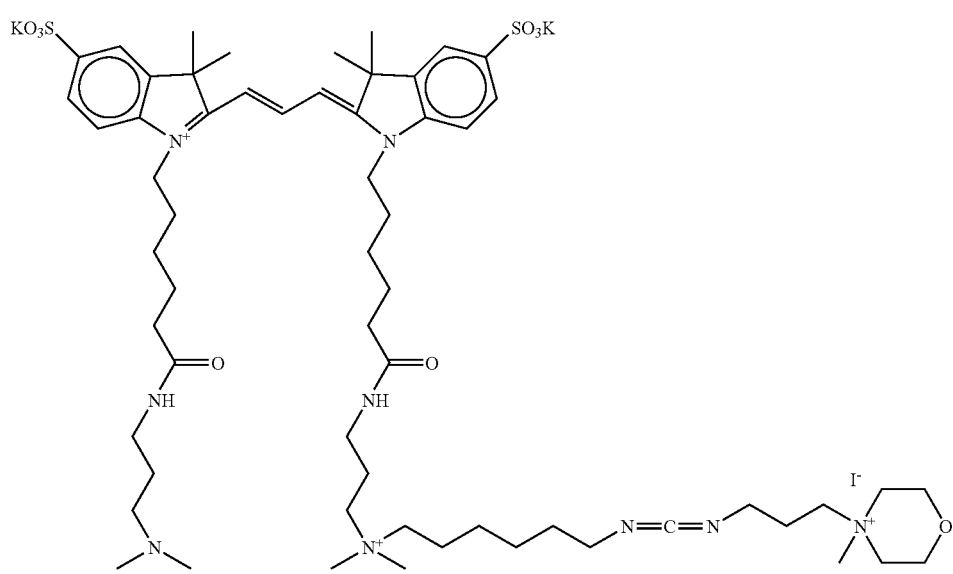

(3)

Example 4

(1) Production of Fluorescent Group-containing Compound Represented by the General Formula (VIII)

Cy5.18.OSu (200 mg, 0.171 mmol) produced by referring to Japanese Patent Application Laid-open No. 9-325147 and Ratnakaer B. Mujumdar et. al., Bioconjugate Chem., 4, 2, 105–111 (1993) was dissolved in DMF (5 ml). After the reaction solution was cooled to 0° C., N-3-(dimethylaminopropyl)amine (70 mg, 0.684 mmol) was gradually added thereto, and the mixture was stirred at room temperature for 12 hours. After this reaction solution was concentrated, ethyl acetate/methanol was added thereto, and the mixture was decanted to obtain Compound (IV-I-A) (184 mg, yield: 94%). The NMR spectrum data are shown below.

$^1$H-NMR (DMSO): δ=1.32–1.65 (m, 12H), δ=1.72 (s, 12H), δ=2.05 (t, 4H), δ=2.00–2.30 (m, 8H), δ=2.15 (s, 12H), δ=2.95 (q, 4H), δ=4.17 (t, 4H), δ=6.57 (d, 3H), δ=7.36–7.95 (m, 6H), δ=8.45 (t, 2H)

(2) Production of Fluorescent Group-containing Carbodiimide Compound Represented by the General Formula (III)

Compound (I-I-D) (82 mg, 0.157 mmol) obtained in the Example 1 (1) and Compound (IV-I-A) (180 mg, 0.157 mmol) obtained in the Example 4 (1) were dissolved in DMF (10 ml), and the solution was stirred overnight at room temperature. To the reaction mixture, ethyl acetate/methanol was further added and the mixture was decanted to obtain Compound (4) (246 mg, yield: 94%) as the fluorescent group-containing carbodiimide compound of the present invention. The NMR spectrum data, IR spectrum data, and UV spectrum data are shown below.

$^1$H-NMR (DMSO): δ=1.22–1.65 (m, 12H), δ=1.72 (s, 12H), δ=2.05 (t, 4H), δ=1.95–2.30 (m, 8H), δ=2.15 (s, 12H), δ=2.95 (q, 4H), δ=4.17 (t, 4H), δ=6.57 (d, 3H), δ=7.32–7.95 (m, 6H), δ=8.45 (t, 2H).

IR: 2127 cm$^{-1}$ (—N=C=N— group).

UV (EtOH): λ$_{max}$ 632 nm

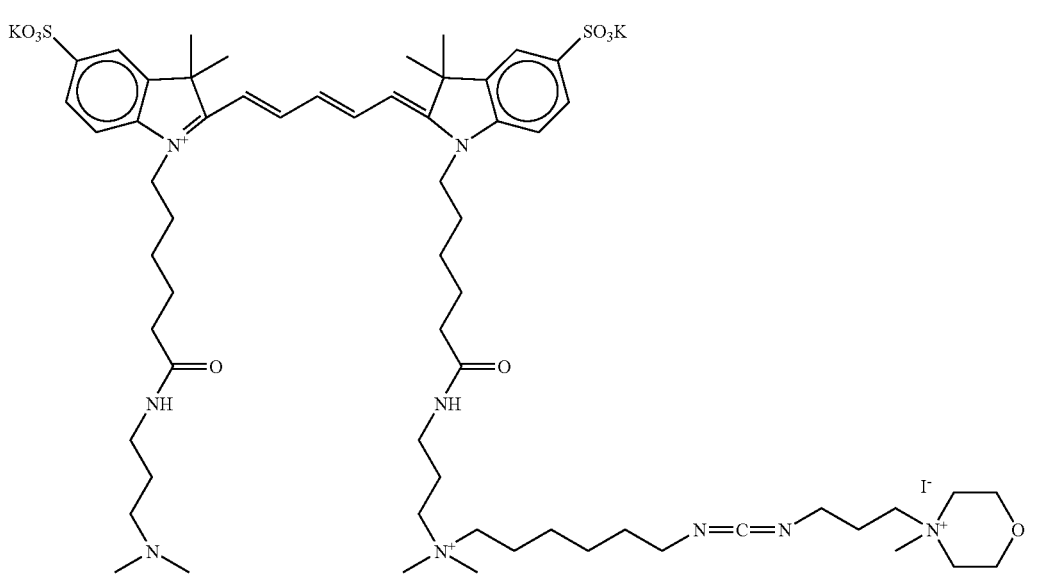

(4)

Example 5

<Water Solubility Test>

Compounds (1)–(4) obtained in Examples 1–4 were tested for their solubility in water. For comparison, the test for solubility in water was also performed for Compound (1') corresponding to Compound (1) where the potassium carboxylate group (—COOK) in the Rhodamine B group was replaced with a hydrogen atom, Compound (2') corresponding to Compound (2) where the sodium sulfonate group (—SO$_3$Na) in the IRD-41 group was replaced with a methyl group, Compound (3') corresponding to Compound (3) where the potassium sulfonate group (—SO$_3$K) in the Cy3 group was replaced with a hydrogen atom, and Compound (4') corresponding to Compound (4) where the potassium sulfonate group (—SO$_3$K) in the Cy5 group was replaced with a hydrogen atom. The results are shown in

TABLE 1

|  | Solubility in water |
| --- | --- |
| Compound (1) | 30 μg/μl |
| Compound (1') | 5 μg/μl |
| Compound (2) | 55 μg/μl |
| Compound (2') | 10 μg/μl |
| Compound (3) | 95 μg/μl |
| Compound (3') | 25 μg/μl |
| Compound (4) | 90 μg/μl |
| Compound (4') | 10 μg/μl |

From these results, it is clear that the fluorescent group-containing carbodiimide compounds of the present invention are excellent in water solubility.

Example 6

Reaction solutions containing 0.1 M of each of Compounds (1), (3) and (4) obtained in the Examples 1, 3 and 4, and 1 μg of phage DNA (M13mp18 replicate type, produced by Takara Shuzo Co., Ltd.) in borate buffer (pH 8.5) were prepared and incubated at 85° C. for 1 minute. To each reaction mixture, 1/9-fold volume of 3 M sodium acetate and 2.5-fold volume of cold ethanol were added and mixed, and the mixture was left at −80° C. for 45 minutes. The mixture was centrifuged at 4° C. and 12,000 rpm for 1.5 minutes by using a centrifugal machine (H-1500FR, produced by Kokusan Co., Ltd.). After the supernatant was removed, the obtained precipitates were dissolved in 100 μl of sterilized water.

Then, 480 ng to 480 pg/100 μl of 10-fold serial dilutions of the phage DNA (M13mp18 replicate type) linearized with a restriction enzyme (HindII) were prepared in 2 M NaCl, heat-treated for 10 minutes at 100° C., and quenched on ice for 5 minutes to obtain heat-denatured nucleic acid. The heat-denatured nucleic acids at various concentrations were added to wells of a plate, and immobilized at 37° C. for 12 hours with plate sealing.

After the plate with the immobilized heat-denatured nucleic acids was washed with distilled water, 100 μl of a prehybridization solution [5×SSC (1×SSC=0.15 M NaCl, 0.015 M sodium citrate), 5× Denhardt's solution (0.02% polyvinylpyrrolidone, 0.2% Ficoll, 0.02% BSA), 25 mM sodium phosphate buffer (pH 6.5), 50% formamide, 0.5 mg/ml yeast tRNA and 0.1% sodium dodecylsulfate] were added to each well, and the plate was shaken by a plate mixer at room temperature for 5 minutes. This procedure was repeated 3 times. The solution in each well was discarded, and 300 μl of 2×SSC was added to each well and left at room temperature for 5 minutes.

Then, 100 μl of 50 mM sodium phosphate buffer (pH 7.0) containing 1.5 M NaCl was added to each well to form fluorescent substance-containing DNA as Compounds (1A), (3A) and (4A). The solutions of the wells were each taken into a capillary tube and irradiated with an excitation light, and fluorescence emitted from the fluorescent group used to label the M13 replicate type DNA was measured by a spectrophotofluorometer (F-3010: produced by Hitachi Co., Ltd.). The results are shown in Table 2.

TABLE 2

|  | Detection limit (ng/well) | Excitation wavelength (nm) | Fluorescence wavelength (nm) |
|---|---|---|---|
| Compound (1A) | 4.3 | 563 | 583 |
| Compound (3A) | 3.2 | 554 | 574 |
| Compound (4A) | 3.3 | 654 | 674 |

From these results, it can be seen that detection of nucleic acid can be performed with high sensitivity according to the method for detection of nucleic acid of the present invention.

What is claimed is:

1. A method for detecting a nucleic acid which comprises hybridizing a nucleic acid labeled with a labeling substance, wherein the labeling substance is a fluorescent group-containing carbodiimide compound having at least one group selected from a carboxyl group, a sulfo group, a phosphono group and a phospho group which have substitution of an alkali metal, an alkaline earth metal or a basic group containing a nitrogen or phosphorus atom, which is represented by the following general formula (III):

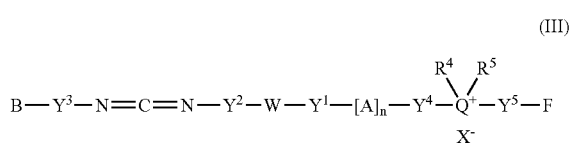

(III)

wherein,

X represents a halogen atom or a sulfonic acid group;

A represents a functional group selected from the group consisting of —$CH_2$—, —NHCO—, —CONH—, —O—, —S—, —$NR^1$— wherein $R^1$ represents a linear, cyclic or branched saturated or unsaturated aliphatic hydrocarbon group having 1–20 carbon atoms, —$NR^2R^3$— wherein $R^2$ and $R^3$ each independently represent a hydrogen atom, a linear or branched saturated or unsaturated aliphatic hydrocarbon group having 1–20 carbon atoms, or a cycloalkyl group, an aryl group or an aralkyl group which may have a substituent, provided that when one of $R^2$ and $R^3$ is a hydrogen atom, the other represents a linear or branched saturated or unsaturated aliphatic hydrocarbon group having 1–20 carbon atoms, or a cycloalkyl group, an aryl group or an aralkyl group which may have a substituent, or $R^2$ and $R^3$ may be bonded to each other to form as a whole a nitrogen-containing heterocyclic group which may contain an oxygen atom, —COO—, —OCO—, —$NHSO_2$—, —NHC(S)NH—, and —$SO_2NH$—;

n represents 0 or 1;

W represents a direct bond or a quaternary onium group;

$Y^1$, $Y^2$, $Y^3$ and $Y^4$ each represent a functional group represented by the general formula (II):

—$(CH_2)_p$—$(L)_r$—$(CH_2)_q$—  (II)

wherein, L represents a functional group selected from the group consisting of —$CH_2$—, —NHCO—, —CONH—, —O—, —S—, —$NR^1$—; p and q each represent an integer of from 0 to 20; and r represents the integers 0 or 1;

B represents a hydrogen atom or a monovalent organic group being the same as or different from -W-$Y^1$—$[A]_n$—$Y^4$; and F represents a fluorescent group;

Q represents either a tertiary or quaternary nitrogen atom, or a tertiary or quaternary phosphorus atom;

$R^4$ and $R^5$ each independently represent a hydrogen atom, a linear or branched saturated or unsaturated aliphatic hydrocarbon group having 1–20 carbon atoms, or a cycloalkyl group, an aryl group or an aralkyl group which may contain a substituent, provided that when one of $R^4$ and $R^5$ is a hydrogen atom, the other represents a linear or branched saturated or unsaturated aliphatic hydrocarbon group having 1–20 carbon atoms, or a cycloalkyl group, an aryl group or an aralkyl group which may contain a substituent, or $R^4$ and $R^5$ may be bonded to each other to form a nitrogen-containing heterocyclic group or a phosphorus-containing heterocyclic group, which may contain an oxygen atom as $Q^+R^4R^5$—;

$Y^5$ has the same meaning as defined for $Y^1$, $Y^2$, $Y^3$ and $Y^4$;

at least one functional group selected from B, $Y^1$, $Y^2$, $Y^3$, $Y^4$, $Y^5$, A, W, $R^4$, $R^5$ and F has at least one group selected from a carboxyl group, a sulfo group, a phosphono group and a phospho group which have substitution of an alkali metal, an alkaline earth metal or a basic group containing a nitrogen or phosphorous atom.

2. The method according to claim 1, wherein the functional group of the fluorescent group-containing carbodiimide compound is selected from B, $Y^1$, $Y^2$, $Y^3$, $Y^4$, A, and W in the formula (III) and has a least one group selected from a carboxyl group, a sulfo group, a phosphono group, and a phospho group which have substitution of an alkali metal, an alkaline earth metal or a basic group containing a nitrogen or phosphorus atom.

3. The method according to claim 1, wherein the functional group of the fluorescent group-containing carbodiimide compound is selected from $Y^5$, $R^4$, $R^5$ and F in the formula (III) and has at least one group selected from a carboxyl group, a sulfo group, a phosphono group and a phospho group which have substitution of an alkali metal, an alkaline earth metal, or a basic group containing a nitrogen or phosphorus atom.

* * * * *